United States Patent Office 3,262,994
Patented July 26, 1966

3,262,994
GRAFT COPOLYMERS OF 2,2-DIMETHYLALKYL ACRYLATES AND STYRENE WITH BUTADIENE-STYRENE POLYMERS
Hugh J. Hagemeyer, Jr., Alden E. Blood, and Marvin B. Edwards, Longview, Tex., assignors to Eastman Kodak Company, Rochester, N.Y., a corporation of New Jersey
No drawing. Filed Aug. 9, 1963, Ser. No. 301,171
7 Claims. (Cl. 260—880)

This invention relates to transparent, improved stability, high-impact resinous graft copolymers of monomeric material consisting of styrene and 2,2-dimethylalkyl acrylates with preformed butadiene-styrene copolymers, and to a process for preparing these graft copolymers.

Butadiene copolymers are known to modify and impart valuable physical properties to materials resulting from graft copolymerizing butadiene polymers with various ethenoid monomers. While rigid and tough thermoplastic materials have resulted in some of these prior art processes, the stability, impact strengths, weathering, heat distortion temperatures, etc., have not proven entirely satisfactory for many commercial applications.

We have now discovered that when a monomer mixture of styrene and a 2,2-dimethylalkyl acrylate is graft copolymerized with certain preformed butadiene-styrene copolymers, in certain specified proportions, the resulting graft copolymers show outstanding thermal and hydrolytic stability, and shaped articles prepared therefrom are normally transparent and demonstrate improved tensile strength, improved impact strength, improved weathering characteristics and higher softening points as compared with related prior art products. Accordingly, the new class of graft copolymers of the invention are ideally suited for the preparation of molded articles requiring high-impact strength and clarity and form superior films of good transparency and gloss, stability and strength.

It is, accordingly, an object of the invention to provide the new class of resinous graft copolymers above described, and shaped articles prepared therefrom of improved characteristics. Another object is to provide a process for preparing these new resinous graft copolymers. Other objects will become apparent hereinafter.

In accordance with the invention, the new class of resinous graft copolymers are prepared by copolymerizing a mixture of (1) from 85 to 97 percent by weight of monomeric material consisting of from 40 to 60 percent by weight of styrene and from 60 to 40 percent by weight of at least one 2,2-dimethylalkyl acrylate represented by the general formula:

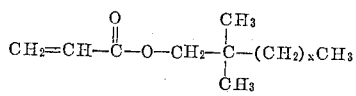

wherein $x$ represents an integer of from 1 to 11, e.g., 2,2-dimethylbutyl acrylate, 2,2-dimethylpentyl acrylate, 2,2-dimethylhexyl acrylate, 2,2-dimethylheptyl acrylate, 2,2-dimethyldecyl acrylate, 2,2-dimethyldodecyl acrylate, 2,2-dimethyltetradecyl acrylate, etc., and (2) from 15 to 3 percent by weight of a preformed copolymer of from 40 to 80 percent by weight of butadiene and from 60 to 20 percent by weight of styrene, until the monomeric material has combined with the preformed butadiene-styrene copolymer to form the resinous graft copolymers of the invention. Compositions outside the above specified proportions will not give the improved graft copolymers of the invention.

The graft copolymerizations of the invention can be carried out by any of the well-known polymerization techniques. The reactions are accelerated by heat, by actinic light such as ultraviolet light and by the use of known polymerization catalysts such as the peroxides, e.g., benzoyl peroxide, acetyl peroxide, lauryl peroxide, tri-acetone peroxide, urea peroxide, t-butyl hydroperoxide, alkyl percarbonates, etc., hydrogen peroxide, alkali metal persulfates, e.g., sodium or potassium persulfates, ammonium persulfate, alkali metal perborates, and the like. Other useful polymerization catalysts are boron trifluoride and azo-bis-nitriles. Mixtures of catalysts can be employed. The quantity of catalyst employed can be varied depending on the reaction medium and other conditions, but ordinarily from about 0.01 to 2 percent, or more, based on the weight of materials to be polymerized, is efficacious.

Advantageously, the polymerizations are carried out under an inert atmosphere, e.g., under nitrogen gas, in mass or in dispersion in a nonsolvent such as water, although other reaction media such as hydrocarbon solvents, e.g., benzene, n-heptane, petroleum ether, etc., oxygenated solvents such as acetone, ethanol, isopropanol, etc., and aqueous solutions of the water-soluble solvents, can also be employed. The term "dispersion" is intended herein to include both true solutions and emulsions. The copolymerizable ingredients can be added in any order to the polymerization reaction mixture. Where the butadiene-styrene copolymer is used in latex form, it is generally more convenient to add the monomers, catalyst, chain regulators, etc., thereto with stirring. The temperature can be varied over a wide range, but preferably from about 50 to 110° C. While atmospheric pressures are preferred, good results are also obtained at pressures substantially above or below normal atmospheric pressures. A continuous polymerization technique can be employed wherein the ingredients are added continuously at a uniform rate and the graft copolymer product is withdrawn as formed from the system in a continuous manner. Advantageously, an activating agent such as an alkali metal bisulfite or metabisulfite, e.g., sodium or potassium bisulfite, can be used in conjunction with the catalyst in approximately equal amount. Chain regulators such as hexyl, octyl, dodecyl mercaptans, etc., which impart improved solubility to the resulting graft copolymers can be added. Stirring, shaking or tumbling of the reaction mixture facilitates the polymerizations and produces more uniform products. Separation of the products can be accomplished by conventional methods of polymer separation from reaction mixtures, for example, by precipitation and filtration, washing, drying, and the like. In general, the resulting graft copolymers have been found to contain approximately the same proportion of constituents as were present in the starting polymerization mixtures.

For preparing the emulsions and the butadiene-styrene copolymer latexes, suitable emulsifying agents include salts of higher fatty acids, e.g., sodium or potassium stearate, palmitate, etc., ordinary soaps, salts of higher fatty alcohol sulfates, e.g., sodium or potassium lauryl sulfate, sodium or potassium stearyl sulfate, etc., salts of aromatic sulfonic acids such as alkylnaphthalene sulfonic acids, and the like.

The preparation of the monomeric 2,2-dimethylalkyl acrylates can be carried out by the alcoholysis process which involves an atmospheric reaction between methyl acrylate and the 2,2-dimethylalkyl alcohols. Catalyst used was tetraisopropyltitanate. The low boiling by-product, methanol, was generally removed in azeotrope form through a 15-plate column. The base material was flashed through a short head to separate product and catalyst residues. The distillate was again fractionated under vacuum to revover the desired products. For a complete outline see Example 1. Alternate methods of preparation include:

(1) Esterification (acrylic acid+2,2-dimethylalkanol)
(2) The cyanohydrin process
(ethylene cyanohydrin+$H_2SO_4$+2,2-dimethylalkanol)
(3) Dehydration of an appropriate alpha hydroxy ester
(4) Dehalogenation of appropriate alpha halo ester The preferred alcoholysis process is illustrated by the following procedure:

PREPARATION OF 2,2-DIMETHYLBUTYL ACRYLATE

To a 2-liter, 3-necked flask fitted with a thermowell was added 774 grams (8 moles) methyl acrylate, 512 grams (6 moles) 2,2-dimethylbutanol, 6 cc. tetraisoproplytitanate and 2 grams hydroquinone. The catalyst went into solution easily. Reacted at atmospheric pressure for 7½ hours to recover 85 percent of theoretical methanol in azeotrope form. Added hydroquinone and flashed through a short head to get away from catalyst. Distilled to recover 2,2-dimethylbutyl acrylate—765 grams=82.6 percent conversion. The product boiled at 80° C./31 mm. The index of refraction was 1.4262 (25° C./D). The specific gravity was 0.8881 (20°C./20° C.) and the freezing point —60° C. Although methyl acrylate is the preferred intermediate in the above procedure, it will be understood that any other of the lower alkyl acrylates can also be employed, for example, ethyl propyl, isopropyl, butyl, etc., acrylates to give generally similar results. Also, the above procedure gives other of the mentioned 2,2-dimethylalkyl acrylates of the invention by selection of the appropriate 2,2-dimethylalkanol. Thus substitution of 2,2-dimethylhexanol in the above procedure gave 2,2-dimethylhexyl acrylate, B.P. 102–103.5° C./24mm., specific gravity 0.8805 (20° C./20° C.), index of refraction 1.4315 (25° C./D), and freezing point —60° C. The conversion was 90 percent.

The following examples will serve to illustrate more fully the manner whereby we practice our invention.

Example 1

Twenty grams of a copolymer containing 70 percent butadiene and 25 percent styrene was added to 230 grams of a monomer mixture containing 60 percent styrene and 40 percent 2,2-dimethylbutyl acrylate. The mixture was stirred until it was homogeneous. Added 0.1 gram benzoyl peroxide and heated under nitrogen for 30 hours at 100° C. The polymer was isolated by mixing with methanol, filtering, and drying. It was a graft copolymer of approximately 37 percent by weight of 2,2-dimethylbutyl acrylate units and the remainder of butadiene and styrene units. A sample molded at 140° C. was clear and hard. The tensile strength was 2000 p.s.i. and the elongation 100 percent. The impact strength was 5.4 ft.-lbs. on a notched sample. Extruded films were clear and tough and showed good stability to weathering and to heated aqueous alkaline solutions.

Example 2

The experiment in Example 1 was repeated except that 2,2-dimethylhexyl acrylate was used in place of 2,2-dimethylbutyl acrylate. The tensile strength was 1800 p.s.i. and the elongation 186 percent. The impact strength on a notched sample was 4.9 ft.-lbs. Films prepared from this graft copolymer were transparent and tough and showed good thermal and hydrolytic stability.

In place of the 2,2-dimethylbutyl acrylate, there may be substituted an equivalent amount of any other of the mentioned 2,2-dimethylalkyl acrylates, for example, 2,2-dimethylhexyl acrylate, or 2,2-dimethyloctyl acrylate, or 2,2-dimethyldodecyl acrylate, or 2,2-dimethyltetradecyl acrylate, etc., to give generally similar graft copolymers of improved chemical and physical properties. Also the proportions of the monomers and butadiene-styrene copolymers can be varied within the specified limits to give other graft copolymers of the invention. All of the graft copolymers can readily be milled, with or without added fillers, pigments, dyes, plasticizers, flow improvers, etc., and most can be blended with other plastic materials compatible therewith such as polystyrene, polyvinyl chloride, acrylonitrile polymers such as for example, butadiene-styrene copolymers, butadiene-acrylonitrile copolymers, and the like, and converted to various shaped articles such as sheets, films, combs, rods, toys, etc., of outstanding stability and strength as set forth previously by the usual compression, injection or extrusion techniques.

This invention has been described in detail with particular reference to certain preferred embodiments thereof, but it will be understood that variations and modifications can be effected within the spirit and scope of the invention as described hereinabove and as defined in the appended claims.

What we claim is:

1. A resinous graft copolymer of (1) from 85 to 97 percent by weight of monomeric material consisting of from 40 to 60 percent by weight of styrene and from 60 to 40 percent by weight of at least one 2,2-dimethylalkyl acrylate having the general formula:

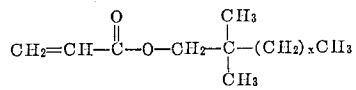

wherein $x$ represents an integer of from 1 to 11 and (2) from 15 to 3 percent by weight of a preformed copolymer consisting of from 40 to 80 percent by weight of butadiene and from 60 to 20 percent by weight of styrene.

2. The resinous graft copolymer according to claim 1 wherein the said acrylate is 2,2-dimethylbutyl acrylate.

3. The resinous graft copolymer according to claim 1 wherein the said acrylate is 2,2-dimethylhexyl acrylate.

4. The resinous graft copolymer according to claim 1 wherein the said acrylate is 2,2-dimethyloctyl acrylate.

5. The resinous graft copolymer according to claim 1 wherein the said acrylate is 2,2-dimethyldodecyl acrylate.

6. The resinous graft copolymer according to claim 1 wherein the said acrylate is 2,2-dimethyltetradecyl acrylate.

7. A process for preparing a resinous graft copolymer which comprises heating in the presence of a polymerization catalyst a mixture comprising (1) from 85 to 97 percent by weight of monomeric material consisting of from 40 to 60 percent by weight of styrene and from 60 to 40 percent by weight of at least one 2,2-dimethylalkyl acrylate having the general formula:

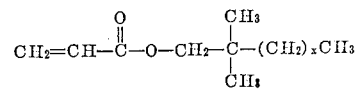

wherein $x$ represents an integer of from 1 to 11, and (2) from 15 to 3 percent by weight of a preformed copolymer consisting of from 40 to 80 percent by weight of butadiene and from 60 to 20 percent by weight of styrene, until the said monomeric material has combined with the said preformed copolymer to form the said graft copolymer.

No references cited.

SAMUAL H. BLECH, *Primary Examiner.*

G. F. LESMES, *Assistant Examiner.*